2,774,711
Patented Dec. 18, 1956

2,774,711
SOLUBILIZED ADRENOCHROME HEMOSTATIC COMPOSITIONS

Desider Fleischhacker, New York, and Norman Barsel, Laurelton, N. Y., assignors to International Hormones, Inc., Brooklyn, N. Y., a corporation of New York No Drawing. Application July 23, 1953,
Serial No. 369,958

8 Claims. (Cl. 167—65)

The present invention relates to certain novel haemostatic compositions.

More particularly, the present invention relates to haemostatic compositions comprising a combination of certain adrenochrome derivatives and non-toxic, preferably injectable water soluble salts of para naphthionic acid, i. e. 1-naphthylamine-4-sulfonic acid.

In our United States Patent No. 2,581,850, issued January 8, 1952, there is disclosed certain combinations of sodium salicylate and adrenochrome derivatives, namely, the semicarbazone and the oxime, which are especially desirable therapeutics for the relief of certain types of bleeding. As pointed out in the aforementioned patent, the combination of at least 25 parts of sodium salicylate to 1 part of the adrenochrome derivative resulted in stable solutions and/or dry compositions containing high usable concentrations of the mono-semicarbazone or the mono-oxime of adrenochrome.

The use of sodium salicylate as a solubilizing agent was thought unique, however, since numerous experiments with chemically analogous materials proved unsuccessful.

In accordance with the present invention, however, the surprising discovery has been made that soluble salts of para naphthionic acid and especially the sodium salt, together with the adrenochrome derivatives, adrenochrome monoxime and adrenochrome semicarbazone, form stable soluble combinations having the ability to not only stop capillary bleeding but also to increase the fibrinogen content and the platelet count of the blood.

Although it is not desired to be limited to this theory, it is believed that the combination of the adrenochrome derivative and the salt of para naphthionic acid is in the nature of a complex since mere dry mixtures of the adrenochrome derivative and the salt will not give the same results as a solution or as a material derived from careful dehydration of a solution of the salt of the naphthionic acid and the adrenochrome derivative.

The salts of para naphthionic acid which have been found useful in accordance with the present invention may be exemplified by the following formula:

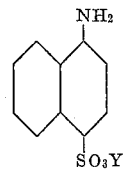

In the above formula, Y preferably represents sodium, although other soluble injectable salts may be utilized as for example, potassium or ammonium so that Y can represent the cations potassium, sodium or ammonium. In general, the salt of para naphthionic must be present in the ratio of at least 20 parts of the naphthionic acid salt to each part of the adrenochrome semicarbazone or the adrenochrome mono-oxime.

In preparing the novel composition of the present invention, a solution of the salt of para naphthionic acid is first prepared, this solution may be saturated, and such a solution in the case of the sodium salt will contain approximately 10% by weight of the sodium salt. A saturated solution will dissolve up to approximately 5 mg. per cc. of the adrenochrome semicarbazone or the adrenochrome mono-oxime at 20° C. There will, therefore, be present in effective therapeutic solutions or in dry combinations derived therefrom about 20 parts by weight of the salt of para naphthionic acid to each part of the adrenochrome derivative. The solution may be made at room temperature or with slight heating. The solutions may be diluted with water to any degree without precipitation or in the alternative more dilute solutions of the sodium salt or other salts of para naphthionic acid may be utilized for dissolving the adrenochrome derivatives. In general, it may be stated that solutions below 1% by weight of the salt of para naphthionic acid are not suitable or feasible for use since only a very small quantity of the adrenochrome derivative may be dissolved in solutions more dilute than 1%.

After the solutions have been made of the adrenochrome derivative and the aforementioned salts they may be evaporated to dryness as by vacuum distillation at temperatures below 50°–60° C., or, preferably, by lyophilizing, i. e., rapid freezing and dehydration in the frozen state under a high vacuum. The solutions may be utilized as such for injection and are especially suitable in the form of aqueous solutions containing for each cc. of solution at least 0.5 mg. of the adrenochrome mono-semicarbazone and/or the adrenochrome mono-oxime. The dry material may be utilized in the form of tablets, being formed into a tablet together with the usual excipients, fillers and/or adhesives. In any event usable solutions or dry combinations will contain at least 20 parts by weight of the aforementioned salts of para naphthionic acid to each part by weight of the adrenochrome derivative.

The following specific examples serve to illustrate but are not intended to limit the present invention:

Example I

To 1 liter of distilled water there was added 100 g. of the sodium salt of para naphthionic acid. The solution was heated and stirred. To the solution was then added 5 g. of adrenochrome semicarbazone. After stirring for a short period of time a clear solution resulted containing for each cc. of solution 5 mg. of adrenochrome semicarbazone. The solution was then sterilized and filled into sterile ampules under aseptic conditions. The solution was stable and could be injected in doses of 10 mg. or more intermuscularly without producing any necrosis or undesirable side reactions. The composition was particularly effective for the control of capillary type bleeding, but unlike the sodium salicylate complexes of our Patent No. 2,581,850 an increased fibrinogen content and platelet count was observed.

Example II

Following the conditions of Example I, a stable solution was prepared containing 5 mg. per cc. of adrenochrome mono-oxime instead of the adrenochrome semicarbazone. The combination was similarly effective for the control of bleeding.

Example III

Following the conditions of Examples I and II, a stable haemostatic solution was prepared containing 0.5 mg. per cc. of adrenochrome mono-oxime or adrenochrome semicarbazone by dissolving 0.5 g. of adrenochrome semicarbazone or mono-oxime in 1 liter of a 10% solution of the sodium salt of para naphthionic acid.

Example IV

Each of the solutions of Examples I, II and III were quick frozen at a temperature of −10° C. The water content was then driven off at a pressure of 100 microns of mercury and a temperature of −20° C., to form a dry product. The dry products were then formed into tablets by adding thereto the usual excipients and fillers such as milk sugar, starch, etc., so that each tablet contained approximately 1 mg. of the adrenochrome derivative. The tablets proved effective for the control of capillary bleeding. As for example, a normal dose of from 3 to 5 tablets daily was sufficient to control various types of bleeding.

We claim:

1. A haemostatic composition comprising at least 20 parts by weight of a non-toxic, water soluble salt of para naphthionic acid and 1 part by weight of an adrenochrome derivative selected from the group consisting of adrenochrome mono-oxime and adrenochrome mono-semicarbazone, said composition having water solubility greater than that of the adrenochrome derivatives per se.

2. A haemostatic composition comprising at least 20 parts by weight of a non-toxic, water soluble salt of para naphthionic acid selected from the class consisting of sodium, potassium and ammonium salts, and 1 part by weight of an adrenochrome derivative selected from the group consisting of adrenochrome mono-oxime and adrenochrome mono-semicarbazone, said composition having water solubility greater than that of the adrenochrome derivatives per se.

3. A haemostatic composition comprising at least 20 parts by weight of the sodium salt of para naphthionic acid and one part by weight of adrenochrome mono-oxime, said composition having water solubility greater than that of the adrenochrome derivatives per se.

4. A haemostatic composition comprising at least 20 parts by weight of the sodium salt of para naphthionic acid and one part by weight of adrenochrome mono-semicarbazone, said composition having water solubility greater than that of the adrenochrome derivatives per se.

5. A haemostatic composition comprising an aqueous solution of at least 20 parts by weight of a nono-toxic, water soluble salt of para naphthionic acid and one part by weight of an adrenochrome derivative selected from the group consisting of adrenochrome mono-oxime and adrenochrome mono-semicarbazone, said solution containing at least 0.5 mg. per cc. of the adrenochrome derivative.

6. A haemostatic composition comprising an aqueous solution of at least 20 parts by weight of a non-toxic, water soluble salt of para naphthionic acid selected from the class consisting of sodium, potassium and ammonium salts, and one part by weight of an adrenochrome derivative selected from the group consisting of adrenochrome mono-oxime and adrenochrome mono-semicarbazone, said solution containing at least 0.5 mg. per cc. of the adrenochrome derivative.

7. A haemostatic composition comprising an aqueous solution of at least 20 parts by weight of the sodium salt of para naphthionic acid and one part by weight of adrenochrome mono-oxime, said solution containing at least 0.5 mg. per cc. of adrenochrome mono-oxime.

8. A haemostatic composition comprising an aqueous solution of at least 20 parts by weight of the sodium salt of para naphthionic acid and one part by weight of adrenochrome mono-semicarbazone, said solution containing at least 0.5 mg. per cc. of adrenochrome mono-semicarbazone.

References Cited in the file of this patent

UNITED STATES PATENTS 2,581,850    Fleischhacker et al. _____ Jan. 8, 1952

OTHER REFERENCES

Bresser: Pharmazeutische Zentralhalle, vol. 71, No. 29, July 17, 1930, pp. 449, 450.

Chemical Abstracts, vol. 46 (1952), col. 5198.

Chemical Abstracts, vol. 23 (1929), col. 4956.